United States Patent
Lakshmanamurthy et al.

(10) Patent No.: US 8,713,240 B2
(45) Date of Patent: Apr. 29, 2014

(54) PROVIDING MULTIPLE DECODE OPTIONS FOR A SYSTEM-ON-CHIP (SOC) FABRIC

(75) Inventors: Sridhar Lakshmanamurthy, Sunnyvale, CA (US); Mikal C. Hunsaker, El Dorado Hills, CA (US); Michael T. Klinglesmith, Portland, OR (US); Blaise Fanning, Folsom, CA (US); Eran Tamari, Ramat Gan (IL); Joseph Murray, Scottsdale, AZ (US); Robert P. Adler, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 13/248,263

(22) Filed: Sep. 29, 2011

(65) Prior Publication Data

US 2013/0086296 A1    Apr. 4, 2013

(51) Int. Cl.
*G06F 13/42*    (2006.01)
*G06F 13/36*    (2006.01)
*G06F 13/00*    (2006.01)
*G06F 9/26*    (2006.01)
*G06F 11/00*    (2006.01)

(52) U.S. Cl.
USPC ........... 710/314; 710/105; 711/165; 711/203; 714/30

(58) Field of Classification Search
USPC .............. 710/314, 105; 711/165, 203; 714/30
See application file for complete search history.

(56) References Cited

U.S. PATENT DOCUMENTS

| | | | |
|---|---|---|---|
| 5,493,566 A | 2/1996 | Ljungerg et al. | |
| 6,009,488 A | 12/1999 | Kavipurapu | |
| 6,233,632 B1 | 5/2001 | Meiyappan et al. | |
| 6,427,169 B1 | 7/2002 | Elzur | |
| 6,611,893 B1 | 8/2003 | Lee et al. | |
| 6,694,380 B1 | 2/2004 | Wolrich et al. | |
| 6,725,313 B1 * | 4/2004 | Wingard et al. | 710/305 |
| 6,810,460 B1 | 10/2004 | Kirkwood | |
| 6,816,938 B2 | 11/2004 | Edara et al. | |
| 7,065,733 B2 | 6/2006 | Goodnow et al. | |
| 7,457,905 B2 | 11/2008 | Gehman | |
| 7,506,089 B2 | 3/2009 | Cho et al. | |

(Continued)

FOREIGN PATENT DOCUMENTS

| | | |
|---|---|---|
| KR | 10-2005-0077437 | 8/2005 |
| KR | 10-2005-0082834 | 8/2005 |
| WO | 2005071553 | 8/2005 |

OTHER PUBLICATIONS

Intel Corporation, "An Introduction to the Intel QuickPath Interconnect," Jan. 2009, pp. 1-22.

(Continued)

*Primary Examiner* — Paul R Myers
*Assistant Examiner* — Christopher A Daley
(74) *Attorney, Agent, or Firm* — Trop, Pruner & Hu, P.C.

(57) ABSTRACT

In one embodiment, a system-on-chip (SoC) can be configured to receive a request from a master agent in a fabric coupled to the master agent, send a show command grant to the master agent responsive to selection of the request by the fabric, receive a command portion of a transaction corresponding to the request in the fabric and determine a target agent to receive the transaction based on the command portion, and thereafter send a transaction grant to the master agent for the transaction. Other embodiments are described and claimed.

21 Claims, 12 Drawing Sheets

(56) References Cited

U.S. PATENT DOCUMENTS

| | | |
|---|---|---|
| 7,573,295 B1 | 8/2009 | Stadler |
| 7,673,087 B1 | 3/2010 | Ansari et al. |
| 7,685,346 B2 | 3/2010 | Teh |
| 7,723,902 B2 | 5/2010 | Mandhani et al. |
| 7,734,856 B2 | 6/2010 | Reinig |
| 7,783,819 B2 | 8/2010 | Mandhani |
| 7,793,345 B2 * | 9/2010 | Weber et al. .............. 726/21 |
| 7,873,068 B2 | 1/2011 | Klinglesmith et al. |
| 7,979,592 B1 | 7/2011 | Pettey et al. |
| 7,990,999 B2 | 8/2011 | Lee |
| 8,010,731 B2 | 8/2011 | Mandhani |
| 8,023,508 B2 | 9/2011 | Horton |
| 8,199,157 B2 * | 6/2012 | Park et al. .............. 345/519 |
| 8,225,019 B2 | 7/2012 | Asnaashari |
| 8,286,014 B2 * | 10/2012 | Han et al. .............. 713/320 |
| 8,364,874 B1 | 1/2013 | Schlansker et al. |
| 8,437,369 B2 | 5/2013 | Shaikli |
| 8,443,422 B2 | 5/2013 | Weber et al. |
| 2002/0038401 A1 | 3/2002 | Zaidi |
| 2003/0088722 A1 | 5/2003 | Price |
| 2003/0126336 A1 | 7/2003 | Creta |
| 2004/0177176 A1 * | 9/2004 | Li et al. .............. 710/33 |
| 2005/0010687 A1 | 1/2005 | Dai |
| 2005/0120323 A1 | 6/2005 | Goodnow et al. |
| 2005/0137966 A1 | 6/2005 | Munguia et al. |
| 2005/0177664 A1 | 8/2005 | Cho et al. |
| 2005/0289369 A1 | 12/2005 | Chung et al. |
| 2005/0289374 A1 | 12/2005 | Kim et al. |
| 2006/0047849 A1 | 3/2006 | Mukherjee |
| 2006/0140126 A1 | 6/2006 | Zhong |
| 2006/0218336 A1 | 9/2006 | Ishizawa et al. |
| 2007/0006108 A1 | 1/2007 | Bueti |
| 2007/0067549 A1 | 3/2007 | Gehman |
| 2008/0059441 A1 | 3/2008 | Gaug et al. |
| 2008/0082840 A1 | 4/2008 | Kendall et al. |
| 2008/0147858 A1 | 6/2008 | Prakash et al. |
| 2008/0163005 A1 | 7/2008 | Sonksen et al. |
| 2008/0235415 A1 | 9/2008 | Clark et al. |
| 2008/0288689 A1 | 11/2008 | Hoang et al. |
| 2008/0310458 A1 | 12/2008 | Rijpkema |
| 2009/0119432 A1 | 5/2009 | Lee et al. |
| 2009/0235099 A1 | 9/2009 | Branover et al. |
| 2009/0249098 A1 | 10/2009 | Han et al. |
| 2009/0296740 A1 | 12/2009 | Wagh |
| 2010/0199010 A1 | 8/2010 | Goren et al. |
| 2010/0262855 A1 * | 10/2010 | Buch et al. .............. 713/324 |
| 2010/0278195 A1 | 11/2010 | Wagh |
| 2011/0047272 A1 | 2/2011 | Bosneag |
| 2011/0078315 A1 | 3/2011 | Matsushita et al. |
| 2011/0078356 A1 | 3/2011 | Shoemaker |
| 2011/0093576 A1 | 4/2011 | Cherian et al. |
| 2011/0179248 A1 | 7/2011 | Lee |
| 2012/0066468 A1 * | 3/2012 | Nakajima et al. .............. 711/165 |
| 2012/0079590 A1 * | 3/2012 | Sastry et al. .............. 726/21 |
| 2012/0233514 A1 * | 9/2012 | Patil et al. .............. 714/734 |
| 2012/0311213 A1 | 12/2012 | Bender et al. |
| 2013/0054845 A1 | 2/2013 | Nimmala et al. |

OTHER PUBLICATIONS

Sousek, et al., "PCI Express Core Integration with the OCP Bus," CAST, Inc., 2006, 15 pages.

Mentor Graphics, "PCI Express to AMBA 3 AXI Bridge IP," Mentor Graphics, Jun. 2007, 2 pages.

Everton Carara, et al., "Communication Models in Networks-on-Chip," 18th IEEE/IFIP International Workshop on Rapid System Prototyping (RSP '07), 2007, pp. 57-60.

U.S. Appl. No. 13/248,234, filed Sep. 29, 2011, entitled, "Sending Packets With Expanded Headers", by Sridhar Lakshmanamurthy, et al.

U.S. Appl. No. 13/248,232, filed Sep. 29, 2011, entitled, "Common Idle State, Active State and Credit Management for an Interface", by Sridhar Lakshmanamurthy, et al.

U.S. Appl. No. 13/248,243, filed Sep. 29, 2011, entitled, "Aggregating Completion Messages in a Sideband Interface", by Sridhar Lakshmanamurthy, et al.

U.S. Appl. No. 13/248,252, filed Sep. 29, 2011, entitled, "Providing Error Handling Support to Legacy Devices", by Sridhar Lakshmanamurthy, et al.

U.S. Appl. No. 13/248,270, filed Sep. 29, 2011, entitled, "Supporting Multiple Channels of a Single Interface", by Sridhar Lakshmanamurthy, et al.

U.S. Appl. No. 13/248,276, filed Sep. 29, 2011, entitled, "Issuing Requests to a Fabric", by Sridhar Lakshmanamurthy, et al.

U.S. Appl. No. 13/222,362, filed Aug. 31, 2011, entitled, "Integrating Intellectual Property (IP) Blocks Into a Processor", by Prashanth Nimmala, et al.

U.S. Appl. No. 13/306,244, filed Nov. 29, 2011, entitled, "Providing a Sideband Message Interface for System on a Chip (SoC)", by Robert P. Adler, et al.

U.S. Appl. No. 13/222,354, filed Aug. 31, 2011, entitled, "Providing Adaptive Bandwidth Allocation for a Fixed Priority Arbiter", by Kie Woon Lim, et al.

U.S. Patent and Trademark Office, Office Action mailed Jun. 7, 2013 with Reply filed Sep. 3, 2013, in U.S. Appl. No. 13/248,232.

U.S. Patent and Trademark Office, Office Action mailed Jun. 20, 2013 with Reply filed Sep. 18, 2013, in U.S. Appl. No. 13/248,243.

U.S. Patent and Trademark Office, Office Action mailed Sep. 18, 2013, in U.S. Appl. No. 13/248,252.

U.S. Patent and Trademark Office, Office Action mailed Jun. 14, 2013 with Reply filed Sep. 9, 2013, in U.S. Appl. No. 13/248,270.

U.S. Patent and Trademark Office, Office Action mailed Jun. 20, 2013 with Reply filed Sep. 17, 2013, in U.S. Appl. No. 13/248,276.

* cited by examiner

PROVIDING MULTIPLE DECODE OPTIONS FOR A SYSTEM-ON-CHIP (SOC) FABRIC

BACKGROUND

Mainstream processor chips, both in high performance and low power segments, are increasingly integrating additional functionality such as graphics, display engines, security engines, PCIe™ ports (i.e., ports in accordance with the Peripheral Component Interconnect Express (PCI Express™ (PCIe™)) Specification Base Specification version 2.0 (published 2007) (hereafter the PCIe™ specification) and other PCIe™ based peripheral devices, while maintaining legacy support for devices compliant with a PCI specification such as the Peripheral Component Interconnect (PCI) Local Bus Specification, version 3.0 (published 2002) (hereafter the PCI specification).

Such designs are highly segmented due to varying requirements from the server, desktop, mobile, embedded, ultramobile and mobile Internet device segments. Different markets seek to use single chip system-on-chip (SoC) solutions that combine at least some of processor cores, memory controllers, input/output controllers and other segment specific acceleration elements onto a single chip. However, designs that accumulate these features are slow to emerge due to the difficulty of integrating different intellectual property (IP) blocks on a single die. This is especially so, as IP blocks can have various requirements and design uniqueness, and can require many specialized wires, communication protocols and so forth to enable their incorporation into an SoC. As a result, each SoC or other advanced semiconductor device that is developed requires a great amount of design complexity and customization to incorporate different IP blocks into a single device. This is so, as a given IP block typically needs to be re-designed to accommodate interface and signaling requirements of a given SoC. For example, for routing transactions through a system, generally agents are required to comply with a given decode mechanism, which can impair flexibility.

DETAILED DESCRIPTION

In various embodiments, a fabric can be configured to handle decoding of incoming transactions to determine an appropriate one or more target agents to be a destination for the transaction. More specifically, a fabric can be implemented to handle decoding of incoming transactions by a selected one of multiple decode options. Such transaction decode options can be used by the fabric to determine the target of a transaction. Once the target is determined, the fabric can determine availability of resources in the indicated target agent(s) to handle the transaction. For example, the fabric may match credits and other resources required for that particular transaction with the credits and resources available in the target agent, to determine when the transaction can be sent to the intended target.

Embodiments can be used in many different types of systems. As examples, implementations described herein may be used in connection with semiconductor devices such as processors or other semiconductor devices that can be fabricated on a single semiconductor die. In particular implementations, the device may be a system-on-chip (SoC) or other advanced processor or chipset that includes various homogeneous and/or heterogeneous processing agents, and additional components such as networking components, e.g., routers, controllers, bridge devices, devices, memories and so forth.

Some implementations may be used in a semiconductor device that is designed according to a given specification such as an integrated on-chip system fabric (IOSF) specification issued by a semiconductor manufacturer to provide a standardized on-die interconnect protocol for attaching intellectual property (IP) blocks within a chip, including a SoC. Such IP blocks can be of varying types, including general-purpose processors such as in-order or out-of-order cores, fixed function units, graphics processors, IO controllers, display controllers, media processors among many others. By standardizing an interconnect protocol, a framework is thus realized for a broad use of IP agents in different types of chips. Accordingly, not only can the semiconductor manufacturer efficiently design different types of chips across a wide variety of customer segments, it can also, via the specification, enable third parties to design logic such as IP agents to be incorporated in such chips. And furthermore, by providing multiple options for many facets of the interconnect protocol, reuse of designs is efficiently accommodated. Although embodiments are described herein in connection with this IOSF specification, understand the scope of the present invention is not limited in this regard and embodiments can be used in many different types of systems.

Figure 1:
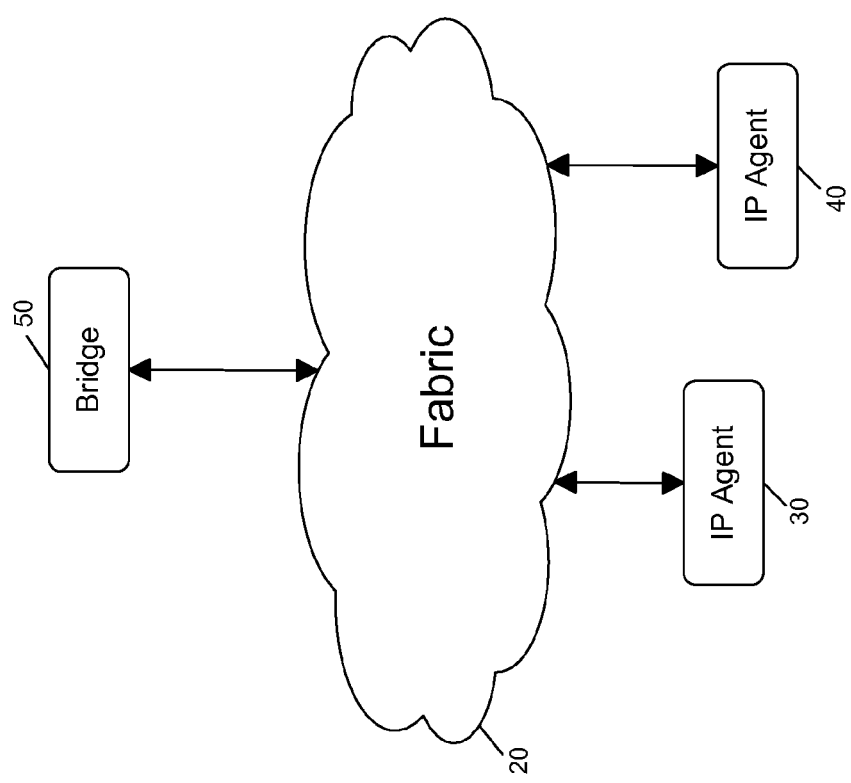
FIG. 1 is a block diagram of a basic interconnect architecture in accordance with an embodiment of the present invention.

Referring now to FIG. 1, shown is a block diagram of a basic interconnect architecture in accordance with an embodiment of the present invention. As shown in FIG. 1, system 10 may be a portion of a system-on-chip or any other semiconductor device such as a highly integrated processor complex or an integrated IO hub, and includes a fabric 20 that acts as an interconnect between various components. In the implementation shown, these components include IP agents 30 and 40, which can be independent IP blocks to provide various functionality such as compute capabilities, graphics capabilities, media processing capabilities and so forth. These IP agents are thus IP blocks or logical devices having an interface that is compliant with the IOSF specification, in one embodiment. As further seen, fabric 20 also interfaces to a bridge 50. Although not shown for ease of illustration in the embodiment of FIG. 1, understand that bridge 50 may act as an interface to other system components, e.g., on the same chip or on one or more different chips.

As will be described further below, each of the elements shown in FIG. 1, namely the fabric, the IP agents, and the bridge may include one or more interfaces to handle communication of various signals. These interfaces may be defined according to the IOSF specification, which defines signals for communication on these interfaces, protocols used for information exchange between agents, arbitration and flow control mechanisms used to initiate and manage information exchange, supported address decoding and translation capabilities, messaging for in-band or out-of-band communication, power management, test, validation and debug support.

The IOSF specification includes 3 independent interfaces that can be provided for each agent, namely a primary interface, a sideband message interface and a testability and debug interface (design for test (DFT), design for debug (DFD) interface). According to the IOSF specification, an agent may support any combination of these interfaces. Specifically, an agent can support 0-N primary interfaces, 0-N sideband message interfaces, and optional DFx interfaces. However, according to the specification, an agent must support at least one of these 3 interfaces.

Figure 2:
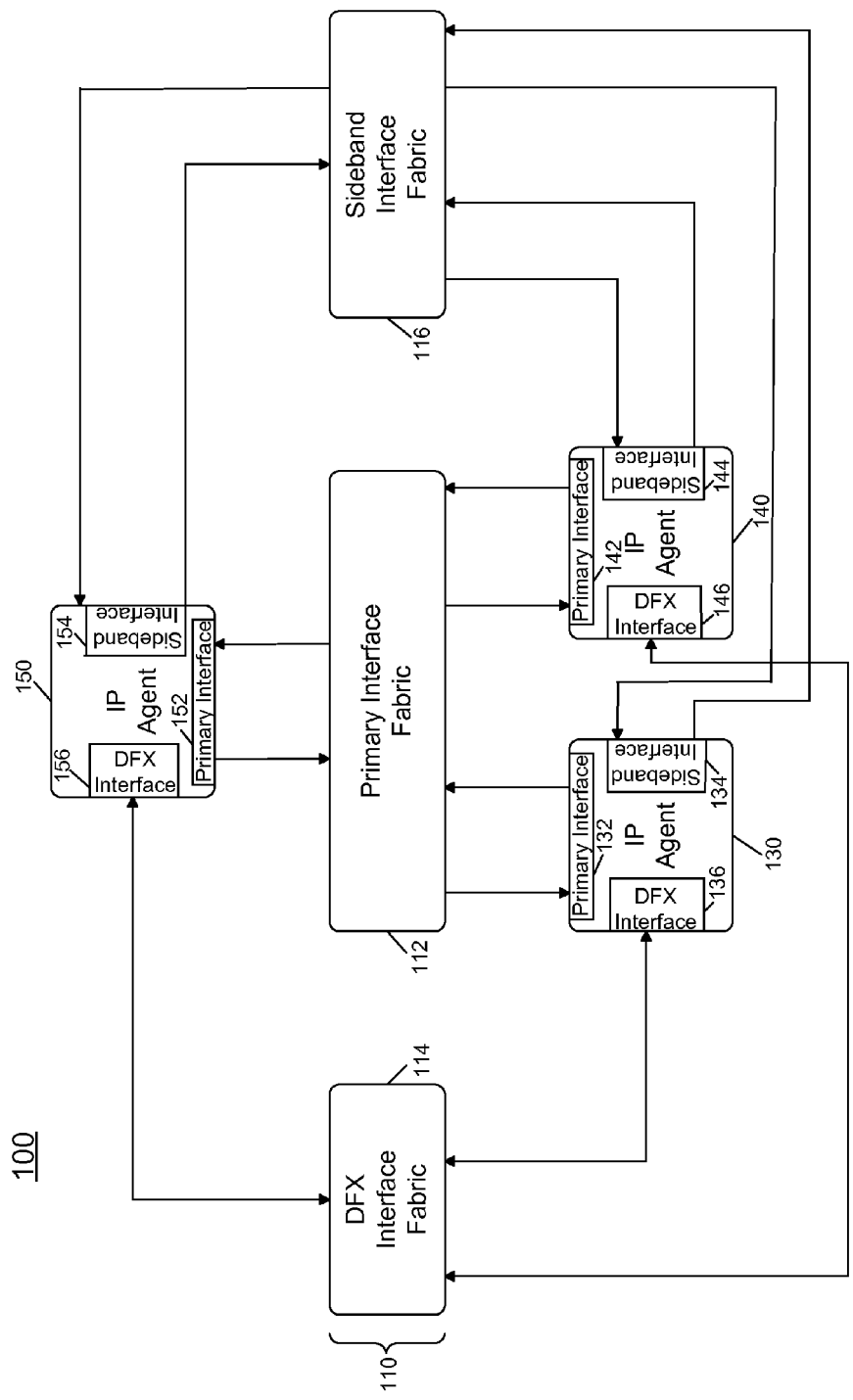
FIG. 2 is a block diagram of further details of an interconnect architecture in accordance with an embodiment of the present invention.

Fabric 20 may be a hardware element that moves data between different agents. Note that the topology of fabric 20 will be product specific. As examples, a fabric can be implemented as a bus, a hierarchical bus, a cascaded hub or so forth. Referring now to FIG. 2, shown is a block diagram of further details of an interconnect architecture in accordance with an embodiment of the present invention. As shown in FIG. 2, the IOSF specification defines three distinct fabrics, namely a primary interface fabric 112, a DFx fabric 114, and a sideband fabric 116. Primary interface fabric 112 is used for all in-band communication between agents and memory, e.g., between a host processor such as a central processing unit (CPU) or other processor and an agent. Primary interface fabric 112 may further enable communication of peer transactions between agents and supported fabrics. All transaction types including memory, input output (IO), configuration, and in-band messaging can be delivered via primary interface fabric 112. Thus the primary interface fabric may act as a high performance interface for data transferred between peers and/or communications with upstream components.

In various implementations, primary interface fabric 112 implements a split transaction protocol to achieve maximum concurrency. That is, this protocol provides for a request phase, a grant phase, and a command and data phase. Primary interface fabric 112 supports three basic request types: posted, non-posted, and completions, in various embodiments. Generally, a posted transaction is a transaction which when sent by a source is considered complete by the source and the source does not receive a completion or other confirmation message regarding the transaction. One such example of a posted transaction may be a write transaction. In contrast, a non-posted transaction is not considered completed by the source until a return message is received, namely a completion. One example of a non-posted transaction is a read transaction in which the source agent requests a read of data. Accordingly, the completion message provides the requested data.

In addition, primary interface fabric 112 supports the concept of distinct channels to provide a mechanism for independent data flows throughout the system. As will be described further, primary interface fabric 112 may itself include a master interface that initiates transactions and a target interface that receives transactions. The primary master interface can further be sub-divided into a request interface, a command interface, and a data interface. The request interface can be used to provide control for movement of a transaction's command and data. In various embodiments, primary interface fabric 112 may support PCI ordering rules and enumeration.

In turn, sideband interface fabric 116 may be a standard mechanism for communicating all out-of-band information. In this way, special-purpose wires designed for a given implementation can be avoided, enhancing the ability of IP reuse across a wide variety of chips. Thus in contrast to an IP block that uses dedicated wires to handle out-of-band communications such as status, interrupt, power management, fuse distribution, configuration shadowing, test modes and so forth, a sideband interface fabric 116 according to the IOSF specification standardizes all out-of-band communication, promoting modularity and reducing validation requirements for IP reuse across different designs. In general, sideband interface fabric 116 may be used to communicate non-performance critical information, rather than for performance critical data transfers, which typically may be communicated via primary interface fabric 112.

As further illustrated in FIG. 2, IP agents 130, 140, and 150 may each include a corresponding primary interface, a sideband interface and a DFx interface. However, as discussed above, each agent need not include every one of these interfaces, and a given IP agent may include only a single interface, in some embodiments.

Figure 3:
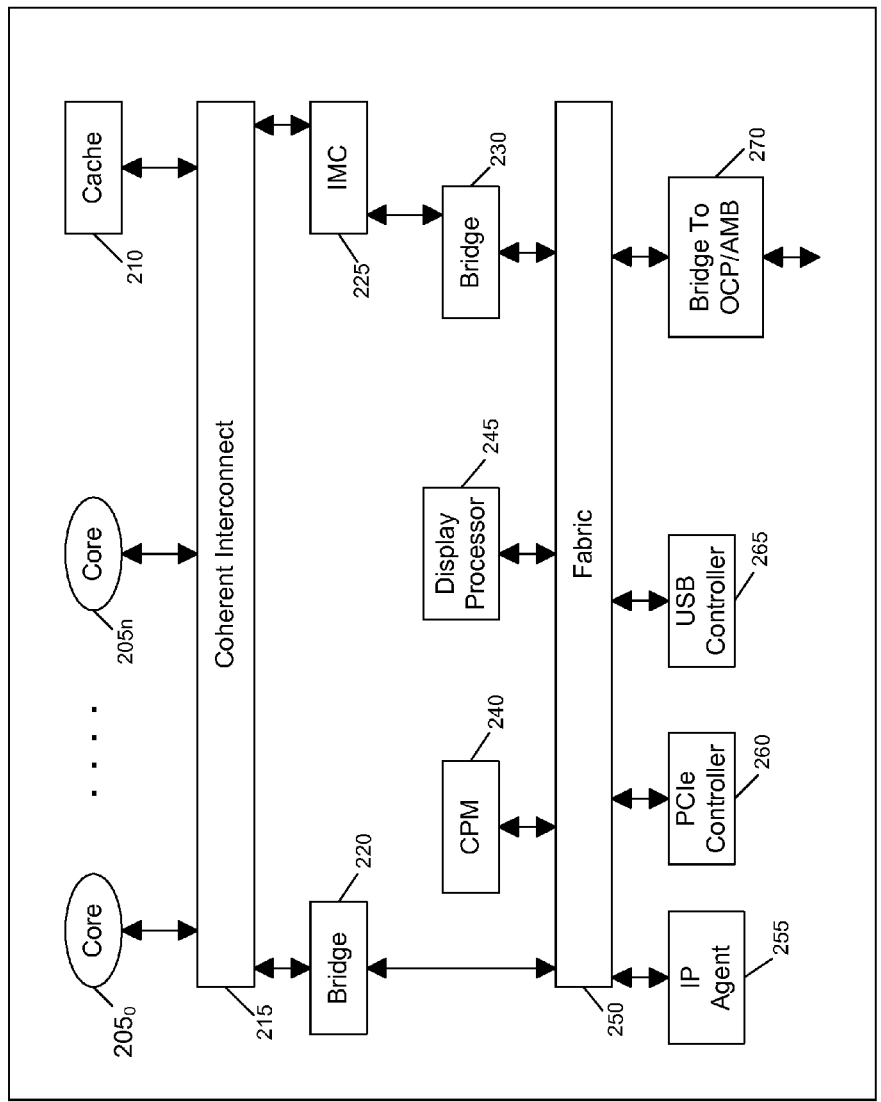
FIG. 3 is a high level block diagram of a SoC in accordance with an embodiment of the present invention.

Using an IOSF specification, various types of chips can be designed having a wide variety of different functionality. Referring now to FIG. 3, shown is a high level block diagram of a SoC in accordance with an embodiment of the present invention. As shown in FIG. 3, SoC 200 may include various components, all of which can be integrated on a single semiconductor die to provide for various processing capabilities at high speeds and low power, consuming a comparatively small amount of real estate. As seen in FIG. 3, SoC 200 includes a plurality of cores $205_0$-$205_n$. In various embodiments, cores 205 can be relatively simple in-order cores or more complex out-of-order cores. Or a combination of in-order and out-of-order cores can be present in a single SoC. As seen, cores 205 can be interconnected via a coherent interconnect 215, which further couples to a cache memory 210, e.g., a shared last level cache (LLC). Although the scope of the present invention is not limited in this regard, in one embodiment coherent interconnect 215 may be in accordance with the Quick Path Interconnect (QPI)™ specification available from Intel Corporation, Santa Clara, Calif.

As further seen in FIG. 3, coherent interconnect 215 may communicate via a bridge 220 to a fabric 250, which may be an IOSF fabric. Coherent interconnect 215 may further communicate via an integrated memory controller 215 to an off-chip memory (not shown for ease of illustration the embodiment of FIG. 3), and further through bridge 230 to fabric 250.

As further seen in FIG. 3, various components can couple to fabric 250 including a content processing module (CPM) 240 which can be used for performing various operations such as security processing, cryptographic functions and so forth. In addition, a display processor 245 can be part of a media processing pipeline that renders video for an associated display.

As further seen, fabric 250 may further couple to an IP agent 255. Although only a single agent is shown for ease of illustration in the FIG. 3 embodiment, understand that multiple such agents are possible in different embodiments. In addition, to enable communication with other on-chip devices, fabric 250 may further communicate with a PCIe™ controller 260 and a universal serial bus (USB) controller 265, both of which can communicate with various devices according to these protocols. Finally, shown in the embodiment of FIG. 3 is a bridge 270, which can be used to communicate with additional components of other protocols, such as an open core protocol (OCP) or an ARM advanced microcontroller bus architecture (AMBA) protocol. Although shown with these particular components in the embodiment of FIG. 3, understand that the scope of the present invention is not limited in this way and in different embodiments additional or different components may be present.

Figure 4:
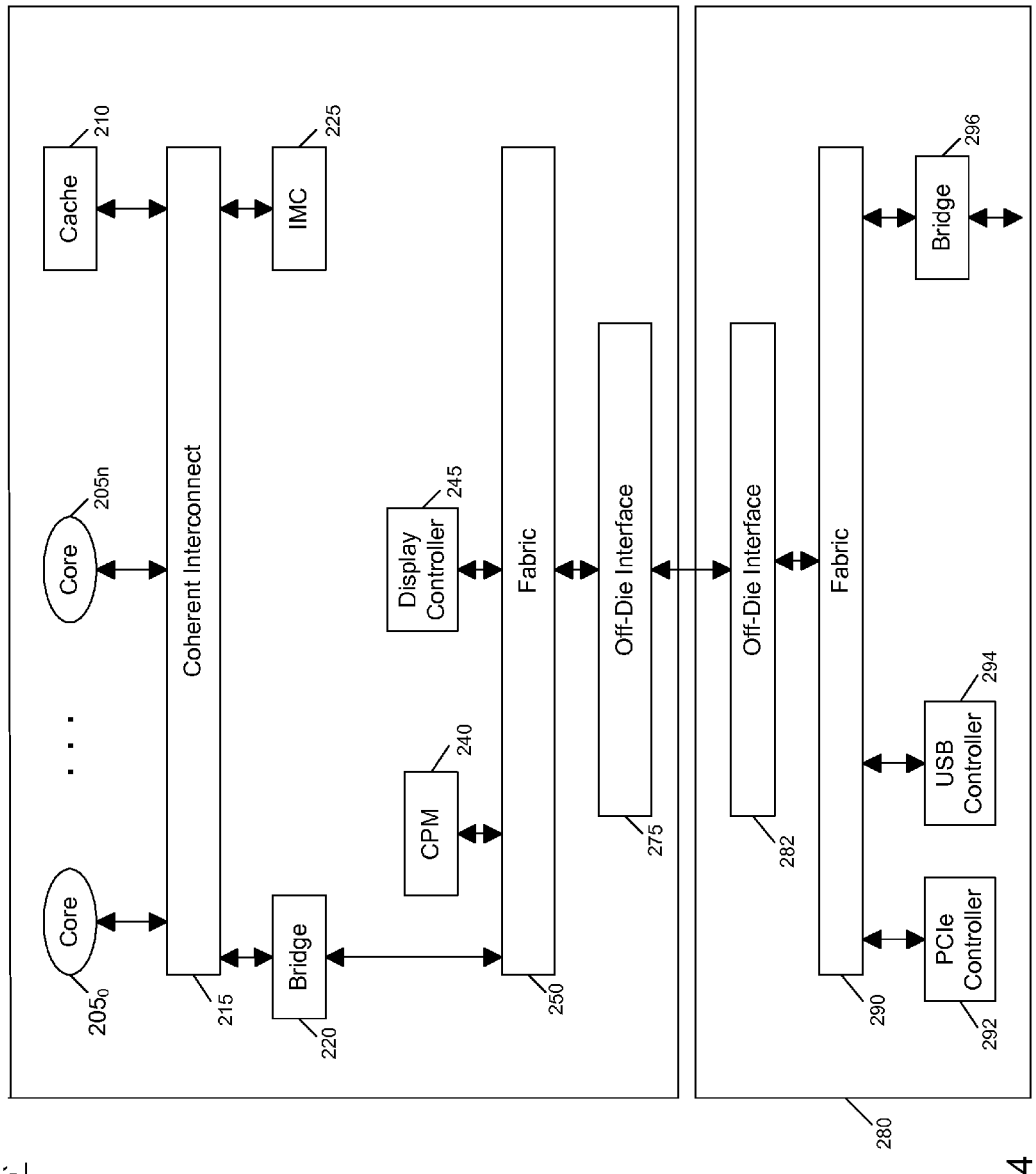
FIG. 4 is a block diagram of a system in accordance with another embodiment of the present invention.

Furthermore, understand that while shown as a single die SoC implementation in FIG. 3, embodiments can further be implemented in a system in which multiple chips communicate with each other via a non-IOSF interface. Referring now to FIG. 4, shown is a block diagram of a system in accordance with another embodiment of the present invention. As shown in FIG. 4, the system may include a SoC 200', which may include many components similar to those discussed above with regard to FIG. 3, and an additional off-die interface 275. Accordingly, SoC 200' can communicate with another chip 280 which may include various functionality to enable communication between these two chips, as well as to various off-chip devices such as different peripherals according to one or more different specifications. Specifically, a second chip 280 is shown to include an off-die interface 282 to enable communication with SoC 200', and which in turn communicates with a fabric 290, which may be an IOSF fabric according to an embodiment of the present invention. As seen, fabric 290 may further be coupled to various controllers in communication with off-chip devices, including a PCIe™ controller 292, a USB controller 294, and a bridge 296.

Figure 5:
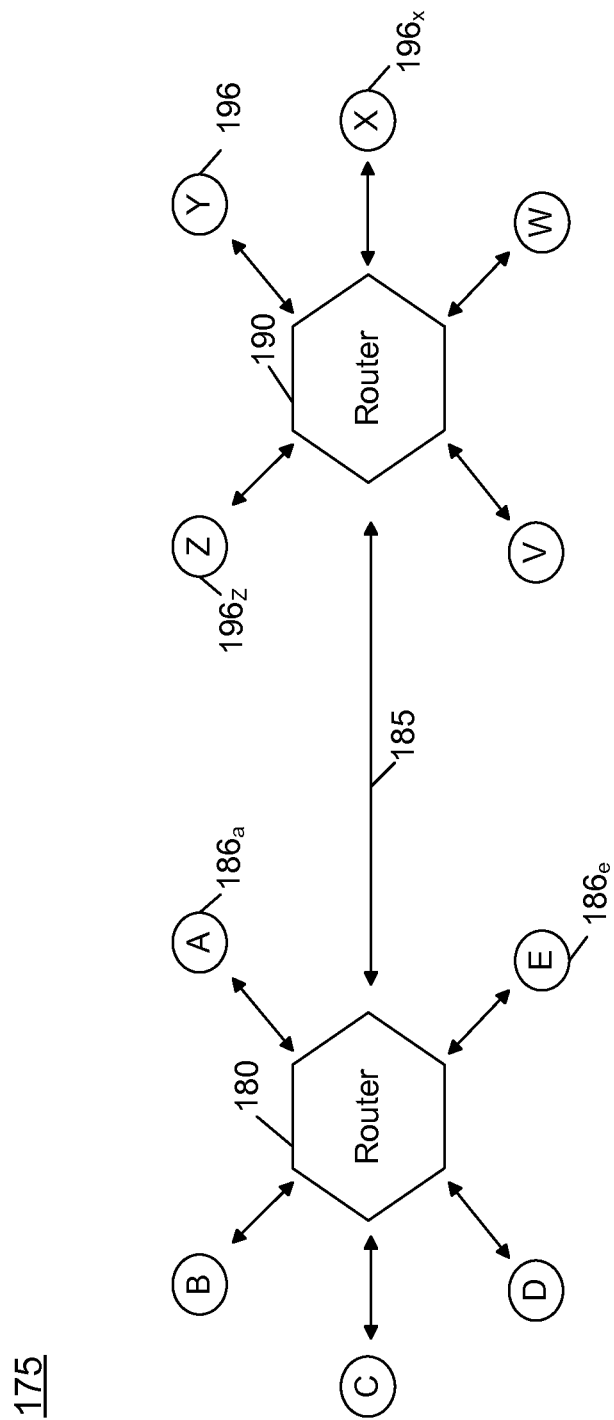
FIG. 5 is a block diagram of a sideband interconnection in accordance with an embodiment of the present invention.

As discussed above, in various embodiments all out-of-band communications may be via a sideband message interface. Referring now to FIG. 5, shown is a block diagram of a sideband interconnection in accordance with an embodiment of the present invention. As shown in FIG. 5, sideband interface system 175 includes multiple routers 180 and 190, which are shown in the embodiment of FIG. 5 as being coupled via a point-to-point (PTP) interconnect 185. In turn, each router can be coupled to various endpoints, which can be, for example, IP agents or other components of a given system. Specifically, router 180 couples to a plurality of endpoints 186a-186e and router 190 couples to a plurality of endpoints 196x-196z.

Figure 6:
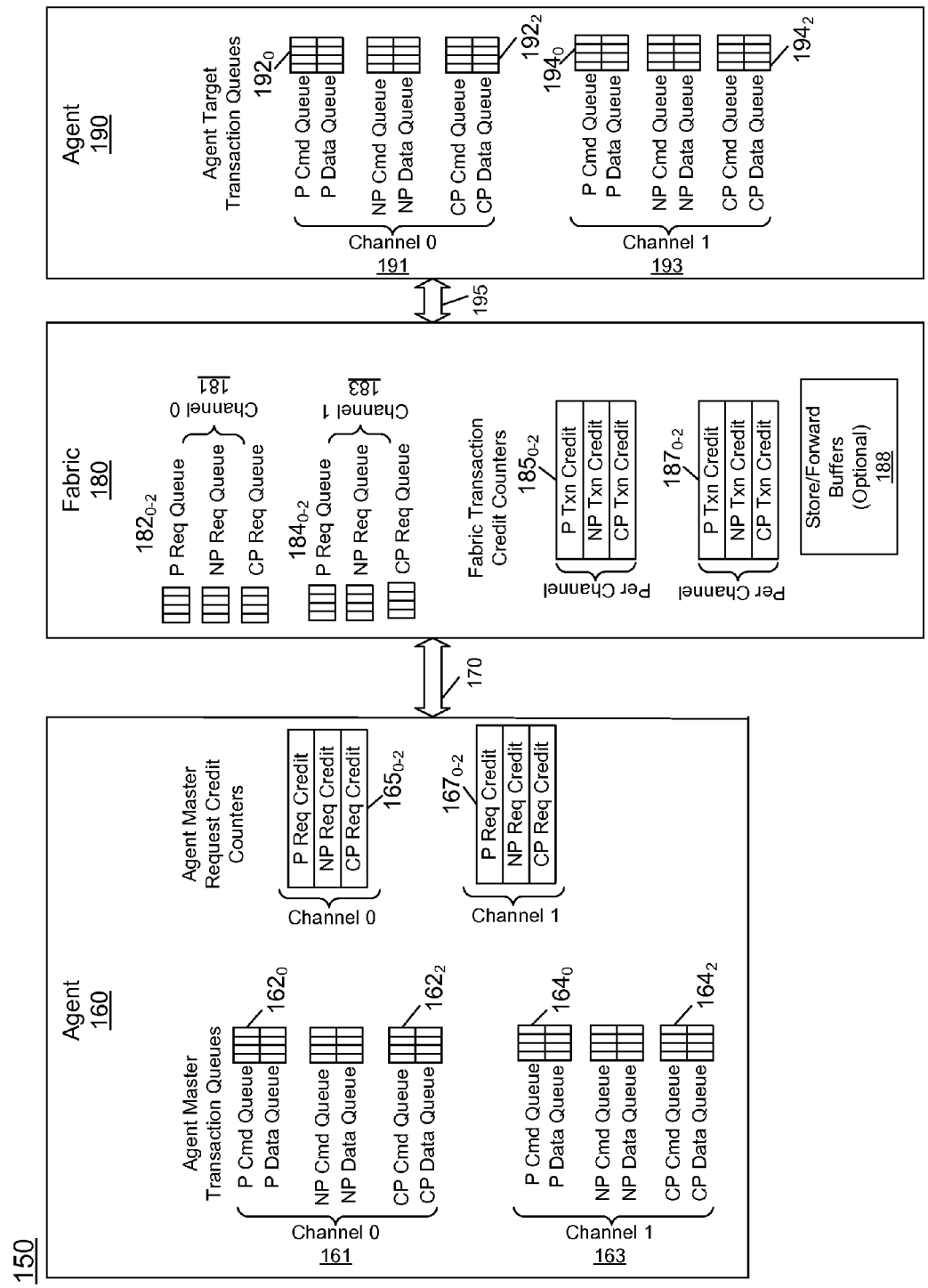
FIG. 6 is a block diagram of a portion of a SoC in accordance with an embodiment of the present invention.

Referring now to FIG. 6, shown is a block diagram of a portion of a SoC in accordance with an embodiment of the present invention. As shown in FIG. 6, the portion of SoC 150 shown includes a master agent 160, a fabric 180, and a target agent 190, coupled via interfaces 170 and 195 respectively. Accordingly, the portion of agent 160 and fabric 180 shown in FIG. 6 is with regard to a master interface of the agent in which the agent seeks to issue transactions to target agents (including target agent 190) and the portion of the fabric shown in FIG. 6 is a portion of a target interface of the fabric that includes request queues to handle incoming requests from master agent 160, and a portion of a master interface that includes transaction credit counters to handle credit control with regard to target agent 190.

As seen, agent 160 includes multiple channels. For ease of illustration, two such channels are shown, namely channel 161 (i.e., channel 0) and channel 162 (i.e., channel 1). Each channel includes corresponding transaction queues $162_0$-$162_2$ and $164_0$-$164_2$ (each for one of posted (P), non-posted (NP), and completion (CP) transaction types). In the embodiment shown, each transaction queue structure may include independent queues for a command portion of a transaction and a data portion of the transaction. And as seen, each channel may include multiple such transaction queues for different request types, namely a posted queue, non-posted, and completion. To determine whether the agent can put a request to fabric 180, each channel may include credit trackers, namely request credit counters $165_0$-$165_2$ and $167_0$-$167_2$. Thus each request type includes its own credit counter to maintain a count of credits available, e.g., corresponding to request queues available in the fabric for the type of request.

In turn, fabric 180 includes multiple channels, namely a first channel 181 (i.e., channel 0) and a second channel 183 (i.e., channel 1). Note that although shown with the matching number of channels, the scope of the present invention is not limited in this regard, and in some embodiments the fabric can be configured with more (but not less) channels than the corresponding master interface of the agent. As seen, each channel may include corresponding request queues for each of the request types, namely queues $182_0$-$182_2$ and $184_0$-$184_2$. Note that as configured, a SoC may have a 1:1 relationship between request queues in the fabric and the request credit counters in the agent. That is, a maximum number of credits available in the agent's request credit counters may correspond to the size of the corresponding request queues in the fabric. Although shown with this particular implementation in the embodiment of FIG. 6, understand the scope of the present invention is not limited in this regard.

As further seen in FIG. 6, fabric 180 can further include fabric transaction credit counters $185_{0-2}$ and $187_{0-2}$. As seen, these transaction credit counters can each be associated with corresponding transaction queues of agent 190. In this way, fabric 180 can determine whether resources are available in the corresponding transaction queues of target agent 190 to handle an incoming transaction.

As will be described further herein, multiple decode options are available, including a show command protocol in which the fabric can be a so-called cut-through fabric that does not include buffering resources to buffer transactions within the fabric. In other implementations, such as where a show command protocol is not used, instead fabric 180 can include store and forward buffers 188. These optional resources, which can be present in a given implementation, thus avoid use of a show command protocol and allow the fabric to receive and store a full transaction in one of these buffers, handle decode, and then forward the transaction to the appropriate target agent when selected for arbitration.

As further seen in FIG. 6, agent 190 includes multiple channels 191 and 193. In turn, a set of transaction queues can be present in each channel, namely queues $192_0$-$192_2$ and $194_0$-$194_2$. Of course, the agent includes further components, but is shown at this high level in the illustration of FIG. 6 for ease of illustration.

Thus in general with respect to FIG. 6, note that master agent 170 has credit counters to correspond to request queues available in fabric 180. In turn, fabric 180 has transaction credit counters to correspond to transaction queues available in target agent 190. Of course, these agents and fabric can include additional sets of credit trackers, queues and so forth with regard to target interfaces (and master interfaces) both for the connections shown here, as well as with regard to connections to other agents of a given SoC.

In an embodiment in accordance with the IOSF specification, the fabric can be configured for multiple transaction decode options. These options can include source decode, fabric decode, target decode, implicit decode and subtractive decode. This flexibility allows different implementations to optimize the decode function for area, performance, power or modularity as needed.

As will be discussed below, all agents of a system may provide for handling target decode, and as such fabrics according to the IOSF specification, regardless of implementation, can provide for such target decode handling. In addition, fabrics according to the IOSF specification can provide for a so-called show command protocol to enable fabric decode with minimal buffering resources implemented in the fabric.

Various implementations of fabric decode are possible, including an implementation that uses the show command protocol and another implementation that does not use this protocol, although other fabrics may be configured to implement both fabric decode protocols. In fabric decode, if the target agent is not implicitly known, the fabric can analyze a command portion of a transaction in order to perform a decode to determine the destination for the transaction. Thus in order to support a full range of fabrics that are optimized for area or performance, fabrics can implement two flavors of fabric decode. If the fabric is optimized for area and does not contain resources to buffer the entire command inside the fabric, it may acquire the command information for the request by using a show command protocol.

In a show command protocol, after an agent has put a request to the fabric arbiter for a given channel ID and request type (QID), the fabric arbiter may optionally assert a grant for that QID with the grant type field set to Show Command. A grant with the type set to Show Command, when received by the source agent, causes the agent master interface to drive the transaction command onto the primary interface, without unloading it from its corresponding queue. By driving the command information onto the primary interface, all the information to be used by the fabric to decode the target of the transaction is available. However, since the transaction is not unloaded from the corresponding queue of the source agent, the fabric does not need to store the transaction in a queue of the fabric. Instead, the fabric can use temporary storage (e.g., a register or other buffer) to process the decode. Accordingly, a request credit tracking facility (e.g., a credit counter or register) corresponding to the request queues of the fabric is not updated (e.g., incremented) as a result of a grant when the grant type is set to show command. The protocol is flexible to allow the fabric arbiter to use the show command protocol for some requests and not others. For example, the show command protocol may only be used for posted and non-posted and not for completion transactions (since posted and non-posted are likely routed based on address, whereas completions are routed by ID). However, all requests with the same QID are processed in the order received.

Figure 7:
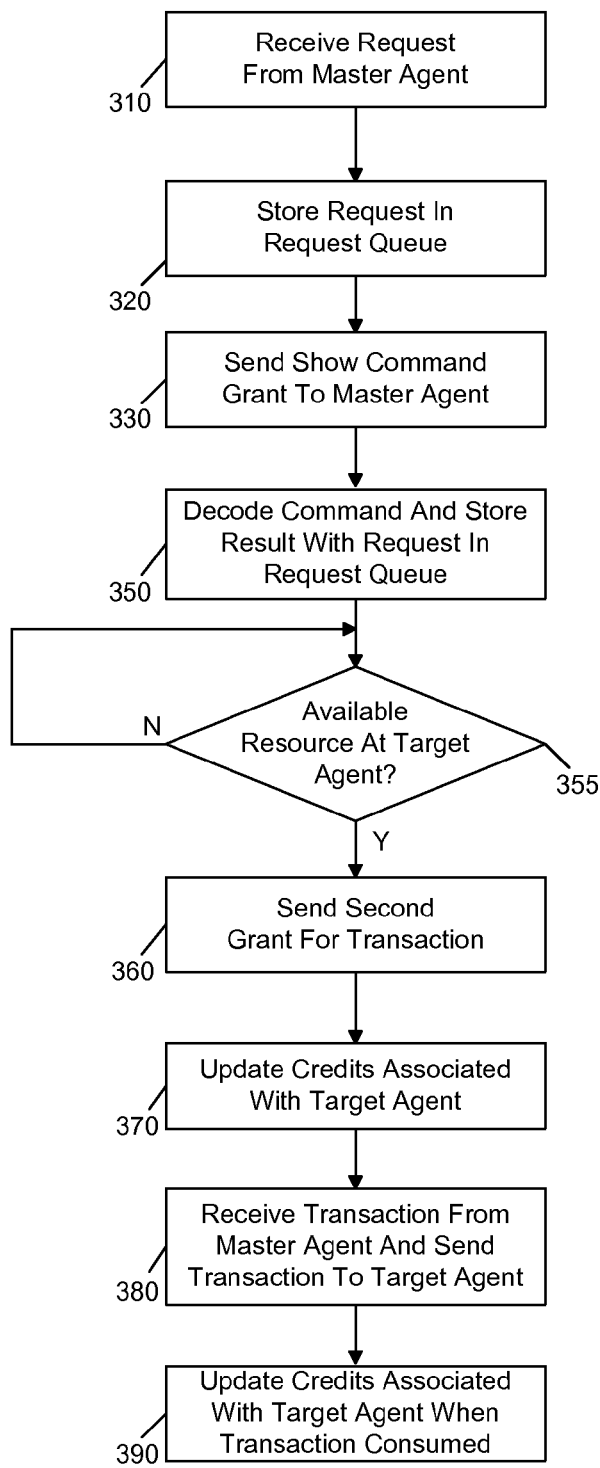
FIG. 7 is a flow diagram of a method for performing a show command fabric decode operation in accordance with an embodiment of the present invention.

Referring now to FIG. 7, shown is a flow diagram of a method for performing a show command fabric decode operation in accordance with an embodiment of the present invention. As shown in FIG. 7, method 300 may be implemented in a fabric to perform fabric decode by a multiple grant process. As seen in FIG. 7, method 300 may begin by receiving a request from a master agent in the fabric (block 310). This request put may include various information, including a request type, attribute information and so forth. Note that the master agent, prior to sending this request, determines whether it has a request credit for the corresponding type of request and channel (e.g., QID). If it has a credit for the QID it wishes to put, it issues the request to the fabric.

Still referring to FIG. 7, control then passes to block 320, where at least portions of the request can be stored in a corresponding request queue of the fabric. Then sometime later, a fabric arbiter of the fabric decides to grant this request, namely by issuance of a show command grant for this request (block 330). Although the scope of the present invention is not limited in this regard in various embodiments, this determination may be based whether an available resource exists and the fabric arbiter selects this request for handling (e.g., according to fabric arbitration logic). This show command grant thus instructs the master agent to send only the command portion of the transaction to the fabric. That is, the master agent, responsive to the show command grant, drives the command portion of the request onto the interface without updating its request credit counter.

Accordingly, at block 350 the fabric may receive this command portion and perform a decode of the request, and store a result (along with the request itself in a request queue). Note that the decode can be performed by decode logic of the fabric or via a target decode mechanism to determine the appropriate target agent for the request.

Control next passes to diamond 355, where it can be determined whether there is an available resource at the determined target agent to handle the request. This determination at diamond 355 can be by reference to a credit tracker associated with a corresponding transaction queue of the target agent. If so, the fabric can issue a transaction grant for the transaction. Thus control passes to block 360 where a second grant can be sent to the master agent for the transaction. More specifically, this grant may be a transaction grant to thus cause the master agent to forward both the command and data portions of the transaction from the corresponding queues in the agent and forward them along to the fabric. By this grant, the fabric removes the corresponding request from its request queue when it issues the grant in order to free the resource. Thus, the master agent will increment its request credit counter when it gets the grant.

At block 370 the fabric may update the credits associated with the target agent, e.g., decrement the transaction credit counter associated with the given channel and request type to which the transaction will be directed. This update to the credit counter occurs such that the state of the credit counters is always consistent with the amount of available space in the agent's transaction queues.

Still referring to FIG. 7, at block 380, the fabric receives the transaction from the master agent and sends the transaction along to the target agent. Note that this operation may occur without first temporarily storing the transaction in the fabric, avoiding the need for store and forward buffers. The target agent, upon receipt of the transaction, may store it in the corresponding transaction queue.

Still referring to FIG. 7, control passes next to block 390 where, assuming that the target agent has consumed the transaction, an update to the transaction credit counter associated with this transaction queue of the target agent can be updated (e.g., an increment to the counter). Although shown with this particular implementation in the embodiment of FIG. 7, understand the scope of the present invention is not limited in this regard.

Although the show command protocol is efficient in terms of area as it does not require the fabric to buffer the entire command, additional latency can be incurred since the fabric issues a subsequent transaction grant to the source agent to enable the source to make forward progress. According to the IOSF specification, an agent can be configured to support the show command protocol even if it transmits source decode information in its request phase.

For designs and specific transaction types that cannot tolerate the additional latency of the show command protocol, a fabric can generate a transaction grant to enable receipt of an entire transaction, which the fabric can store into a buffer, e.g., a store and forward buffer. In this type of fabric decode option, the fabric arbiter can grant a request put from a source agent with the grant type field set to Transaction. Once the fabric has access to the command, it can perform the fabric decode function internally. In this case, when transmitted from the source agent, the transaction is unloaded from the queues in the requester (and thus the request credit counter can be updated).

Figure 8:
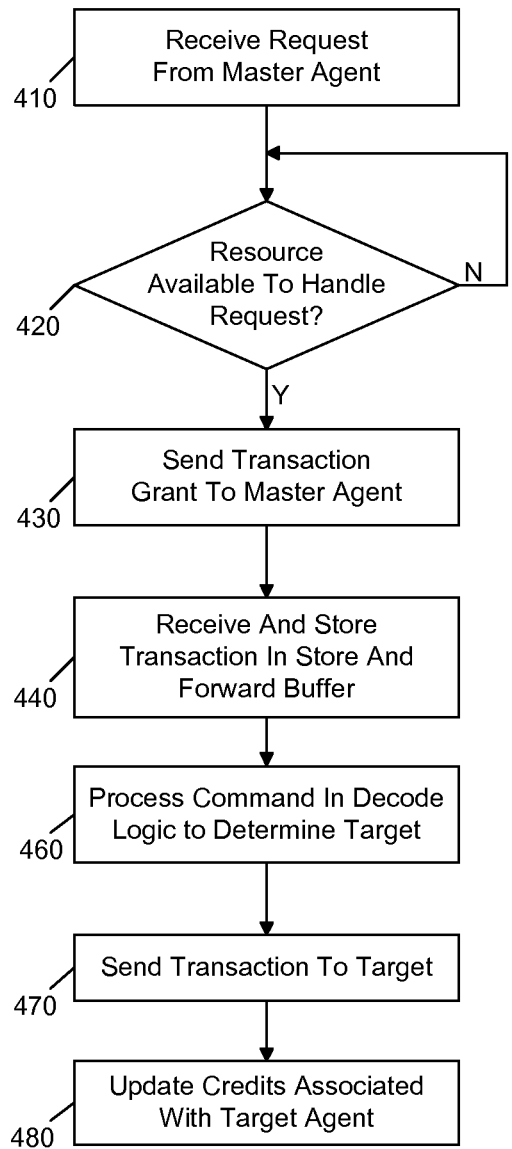
FIG. 8 is a flow diagram of a method for performing a fabric decode operation in accordance with another embodiment of the present invention.

Referring now to FIG. 8 shown is a flow diagram of a method for performing a fabric decode in accordance with another embodiment of the present invention. As shown in FIG. 8, method 400 may be used by a fabric arbiter to perform a fabric decode without the need for a show command protocol. As discussed above, such method may be used for a lower latency design, although potentially at the cost of greater queue resources. As seen in FIG. 8, method 400 may begin by receiving a request from a master agent in the fabric (block 410). Control then passes to diamond 420 to determine whether there is a resource available to handle the request, e.g., based on whether the fabric has available space in its local buffers. If an available resource exists, control passes to block 430 where the fabric arbiter can send a transaction grant to the master agent, if it chooses this request to be granted from among the other requests available (block 430).

Accordingly, the master agent, responsive to this transaction grant, can extract the corresponding transaction from its transaction queue and forward it along to the fabric. Thus control passes to block 440 where the fabric can receive the transaction and store it, e.g., in a store and forward buffer (block 440). Because at this time the master agent has removed the transaction from its transaction queue, internal trackers of the master agent for the transaction queue can be updated, e.g., by incrementing a credit tracker associated with the corresponding transaction queue of the master agent to thus indicate the availability of additional queue resources. And the master agent can update its request credit counter since it received a grant, which implicitly means that it has a new request credit to use.

Still referring to FIG. 8, next the appropriate target for the transaction can be determined. More specifically, the decode logic of the fabric can process the command portion of the transaction to determine its target (block 460). As discussed above, various manners of determining a target agent for a transaction can be used. When the target has been determined, and assuming that sufficient resources are available in the target agent to receive the transaction, control passes to block 470 where the transaction can be sent to the arbiter. Accordingly, because the target agent stores the received transaction in its corresponding transaction queue, control passes to block 480 where a credit associated with the target agent can be updated. More specifically, a credit tracker for the corresponding transaction queue of the target agent can be updated, e.g., decremented, to reflect this additional entry. While shown with this particular implementation in the embodiment of FIG. 8, understand the scope of the present invention is not limited in this regard.

Note that in either case of fabric decode, the fabric is configured to include a mechanism to perform the decode operation. For example, the fabric may include mapping logic that can include or be coupled to mirror or shadow copies of configuration registers of the attached target agents to enable it to perform the decode. The mechanism by which the shadow registers are programmed can be fabric specific. For example, the mapping can be accomplished by snooping configuration transactions to the agent, by using a sideband message interface to gather the required information during configuration and enumeration, or by using other fabric-specific mechanisms. As examples, for Type 0 configuration transactions, the fabric can determine the appropriate target agent based on the target ID bus, device, and function number of the transaction. For agents that are not bridges, the fabric can determine the target based on the target ID bus, device and function number for completions and "Route by ID" messages.

To support PCI point-to-point (P2P) bridges with Type 1 configuration headers, the fabric can maintain a shadow copy of the bridges' secondary and subordinate bus number registers. The fabric can use these registers to route Type 1 configuration transactions, completions, and "Routed by ID" messages to the bridge for devices that reside on the secondary side of the bridge.

To perform fabric decode of memory and input/output (IO) transactions, the fabric may also minor or shadow base address registers (BAR) of endpoint agents, or base and limit registers of bridges, and memory space enable (MSE), IO space enable (IOSE), power management power state and function level reset (FLR) registers of agents. For fabrics that support multiple channels, the fabric may include a mechanism to identify the channel mapping definition of each target agent. In different implementations, channel mapping can be based on any combination of command attributes like address, requester ID, tags and traffic classes, as per an agent specific definition.

In some embodiments fabric decode can provide certain advantages as compared to other decoding mechanisms: lower latency than target decode; less command bandwidth if used without the show command protocol, thus enabling high bandwidth fabrics to operate at lower frequencies; and the ability to support agent level power gating in the absence of software support. That is, utilizing fabric decode, the fabric can determine the target of a transaction and if the target has been power gated, apply power and bring the agent to a state where it can accept the transaction. In such embodiments, the target agent can be instructed by the fabric to exit a low power state responsive to determining that the transaction is destined for the target agent, so that the target agent receives the transaction when in an active state. In some implementations, layout requirements may dictate the use of fabric decode. For example, a subtractive port may physically be connected to a fabric near the root and the fabric may need to determine that the transaction needs to be sent down the subtractive port before it has had an opportunity to issue target decode cycles to other downstream ports.

In some embodiments, a fabric implementing fabric decode may have already decoded the destination of a given transaction. In hierarchical fabric implementations, this previous decoding can be utilized as "source decode" information by the next fabric to route transactions without having to decode them again. In such an implementation, the upper-level fabric presents the destination ID to the next hop fabric over the target command interface. If the destination agent is attached on another fabric below the current one, it forwards the transaction down. This continues until the final target is reached. In some embodiments, a fabric arbiter may have the option to ignore the source decode request attributes and use fabric decode or target decode to determine the target.

As described above, embodiments can further provide for decode operations in addition to fabric decode, including target decode. Each target agent may implement a decoder for its own transactions, which can be leveraged by the fabric for target-based decoding. If a target decode control signal is asserted by the fabric, an agent decodes the transaction and asserts a valid hit or subtractive hit (sub_hit) signal N clocks later if it is the target of the transaction. All agents can support a target decode of one clock and may optionally support a multi-clock pipelined target decode. The number of clocks, N, that the agent requires to perform a pipelined target decode may be predetermined by design of the agent instance and can be 1, 2, or more clock cycles, as dictated by the agent and the component in which it is instantiated. All agents, regardless of the target decode pipeline depth, are configured to receive a target decode request on every clock cycle.

Agents can function as positive decode devices, subtractive decode devices or both in a system. The agents may accordingly implement a hit signal, a sub_hit signal or both signals. The hit signal is a response to a positive decode and sub_hit signal is a response to a subtractive decode. These hit signals may further include an identification of a channel for receipt of the corresponding transaction. An agent can implement both signals, but it cannot assert both signals in response to a target decode request. The subtractive agent asserts a positive hit for broadcast transactions that target the agent.

The primary advantage of target decode is the ability to support agent addition or removal with minimum changes to the fabric logic, although additional latency may be needed to complete decode and the additional command bandwidth consumed by target decode cycles, although the fabric can maintain full throughput by pipelining the target decode cycles.

Figure 9:
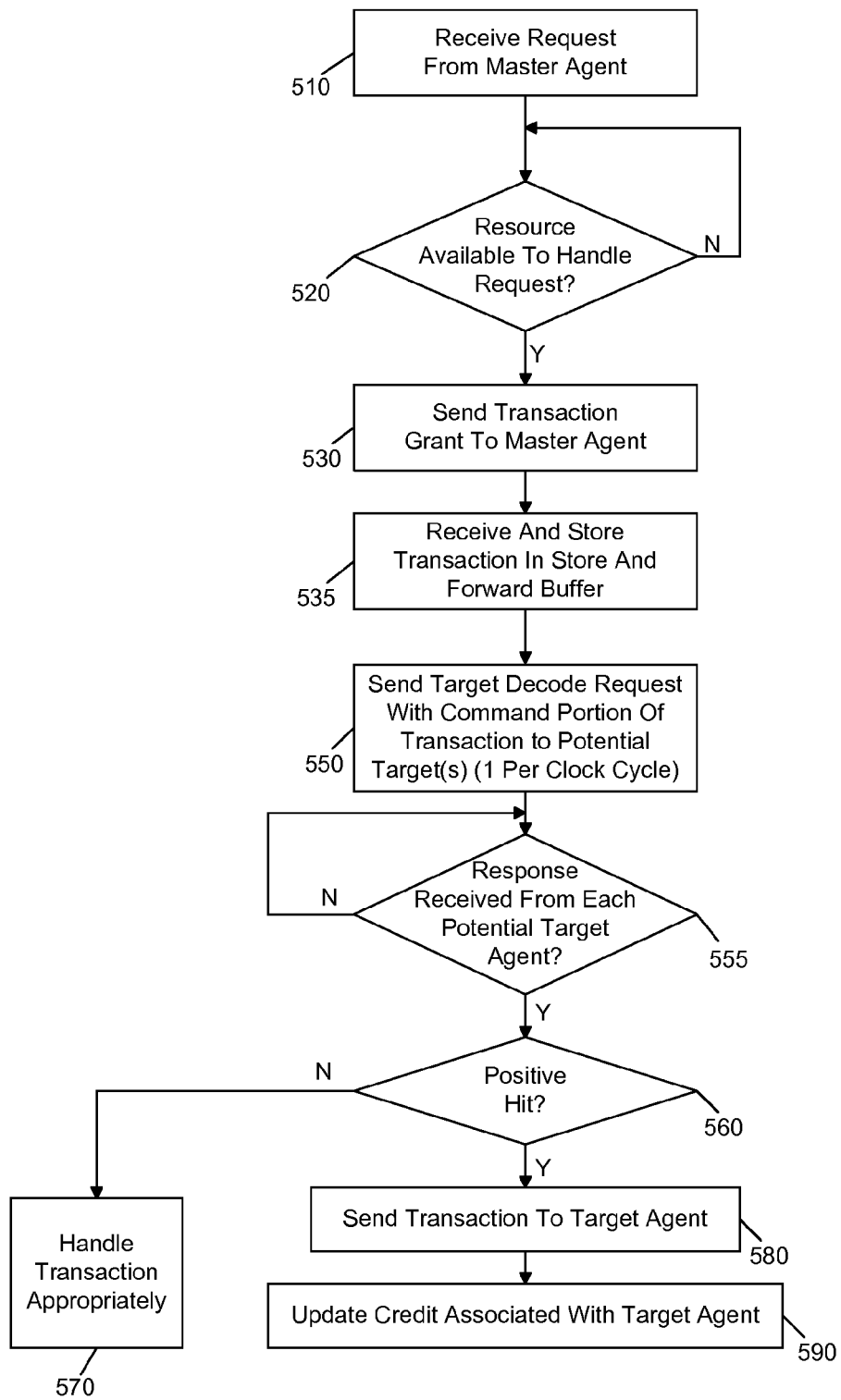
FIG. 9 is flow diagram of a method for performing a target decode operation in accordance with an embodiment of the present invention.

Next referring to FIG. 9, shown is a method for performing a target decode operation in accordance with an embodiment of the present invention. As shown in FIG. 9, method 500 may be implemented by a fabric arbiter, and may begin by receiving a request from a master agent in the fabric (block 510). Control then passes to diamond 520 to determine whether there is a resource available to handle the request. In one embodiment, this determination depends on whether the fabric has an internal buffer or not. If a show command protocol is not used, the fabric includes an internal buffer on which this resource analysis is based. If an available resource exists, control passes to block 530 where the fabric arbiter can send a transaction grant to the master agent. Accordingly, the master agent, responsive to this transaction grant can extract the corresponding transaction from its transaction queue and forward it along to the fabric. Thus control passes to block 535 where the fabric can receive a transaction and store it, e.g., in a store and forward buffer. And at block 540 credits associated with the corresponding transaction queue of the master agent can be updated, e.g., incremented.

To perform a target decode operation, the fabric may send a target decode request with a command portion of the transaction to potential targets (block 550). Thus for a single transaction, a target decode request can be broadcast to all agents coupled to the fabric. In some embodiments, this request can be forwarded by additional fabric hierarchy layers to all components in the SoC.

Note that the target decode request performed at block 550 can be issued in a single cycle and furthermore that the fabric is capable of pipelining target decode requests such that during each clock cycle, a different target decode request (corresponding to a different transaction) can be sent. However for ease of discussion, operations for a single target decode process are described. Accordingly, control passes to diamond 555 where it can be determined whether a response has been received from each potential target agent. That is, because potential target agents may be of different designs and at different locations on a die, varying amounts of clock cycles may occur before responses are received from all of these potential target agents.

When it has been determined that all responses have been received, control passes to diamond 560, where it can be determined whether a positive hit is identified. That is, an agent that is the target agent for a transaction may send a hit signal to indicate that it is the destination for the transaction. Accordingly, if a positive hit signal is received, control passes to block 580 where the transaction can be sent to the target agent. Additionally, at block 590 credits associated with this target agent may be updated. More specifically, a credit tracker for the corresponding transaction queue of the target agent can be updated, e.g., decremented, to identify the forwarding of this transaction.

If instead at diamond 560 it is determined that there is no positive hit, e.g., the only hit signal received is a subtractive hit from a subtractive agent, control passes instead to block 570. There the transaction may be handled based on the situation. For an error case, transactions that do not require a response (i.e., posted and completion transactions), the transaction can be dropped. Transactions that do require a response (non-posted) are completed with an unsuccessful state (i.e., an error response). Note that this could be done either by the fabric or by the subtractive agent. Although shown with this particular implementation in the embodiment of FIG. 9, understand the scope of the present invention is not limited in this regard.

Embodiments may also support source decode, in which the source of a transaction determines the entire transaction routing through the system, and the fabric is presented with information of the final transaction destination. As such, the fabric receiving the transaction need not decode the command to identify the intended target. In one embodiment, the decoded information is conveyed via an optional field called a destination ID, e.g., present in a command portion of the request. If an agent implements source decode, then the agent decodes the target and presents this information to the fabric using the destination ID field on its master control and command interface. The destination information is sent in the request phase to enable the fabric request arbiter to make routing decisions prior to analyzing the command. The fabric can use this information to route the transaction to the destination. In a multi-hop fabric, this information can be carried across fabrics, to the final fabric on which the eventual target agent is attached. Thus embodiments may enable a hierarchical fabric implementation where the transaction decode occurs at the source and all subsequent hops in the fabric between source and target agents rely on the source decode information sent with the request. This option is extremely efficient from area and performance perspective, although a source agent has to be configured to include information about the entire system.

Figure 10:
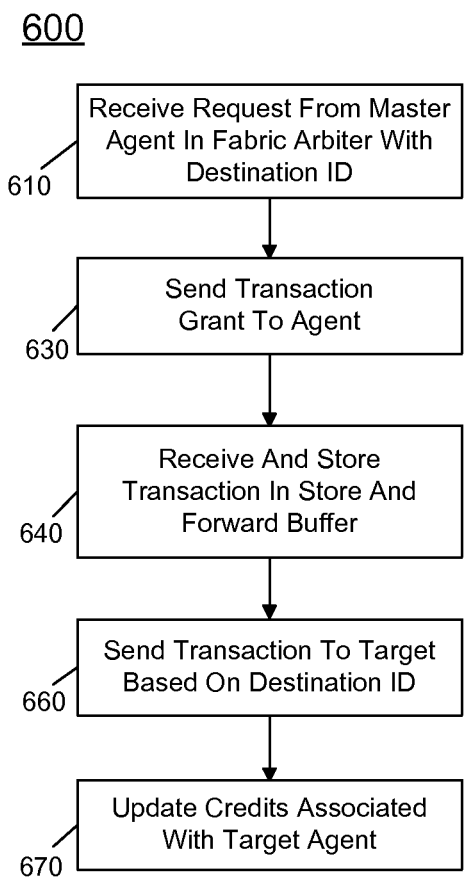
FIG. 10 is a flow diagram of a method for performing source decode in accordance with an embodiment of the present invention.

Referring now to FIG. 10, shown is a flow diagram of a method for performing source decode in accordance with an embodiment of the present invention. As shown in FIG. 10, method 600 may be performed by a fabric arbiter. The method may begin by receiving a request from a master agent that includes a destination identifier as an attribute of the request (block 610). Accordingly, by way of this attribute, the fabric arbiter is aware of the destination of the transaction.

Control then passes to block 630, where a transaction grant can be sent to the master agent for the transaction to thus cause the master agent to forward both the command and data portions of the transaction from the corresponding queues in the agent and send them along to the fabric. Accordingly, at block 640 the transaction may be received and stored in a store and forward buffer of the fabric arbiter. Note that responsive to the transaction grant, the master agent can update its request credit counter to reflect the grant.

Still referring to FIG. 10, control passes next to block 660 where, after the fabric determines that sufficient credits are available, the transaction can be sent to the target agent. The target agent, upon receipt of the transaction, may store the transaction in the corresponding transaction queue. As a result, credits associated with the target agent may be updated, e.g., a transaction credit counter associated with the target agent can be decremented (block 670).

Embodiments thus provide a fabric that can support a plurality of basic decode building blocks such as the show command fabric decode protocol and the target decode protocol. In this way, an IP designer may design an IP block that can incorporate a range of decode functions, enabling reuse of that IP block across multiple fabric implementations, and allowing an implementation to choose an optimized decode solution.

Figure 11:
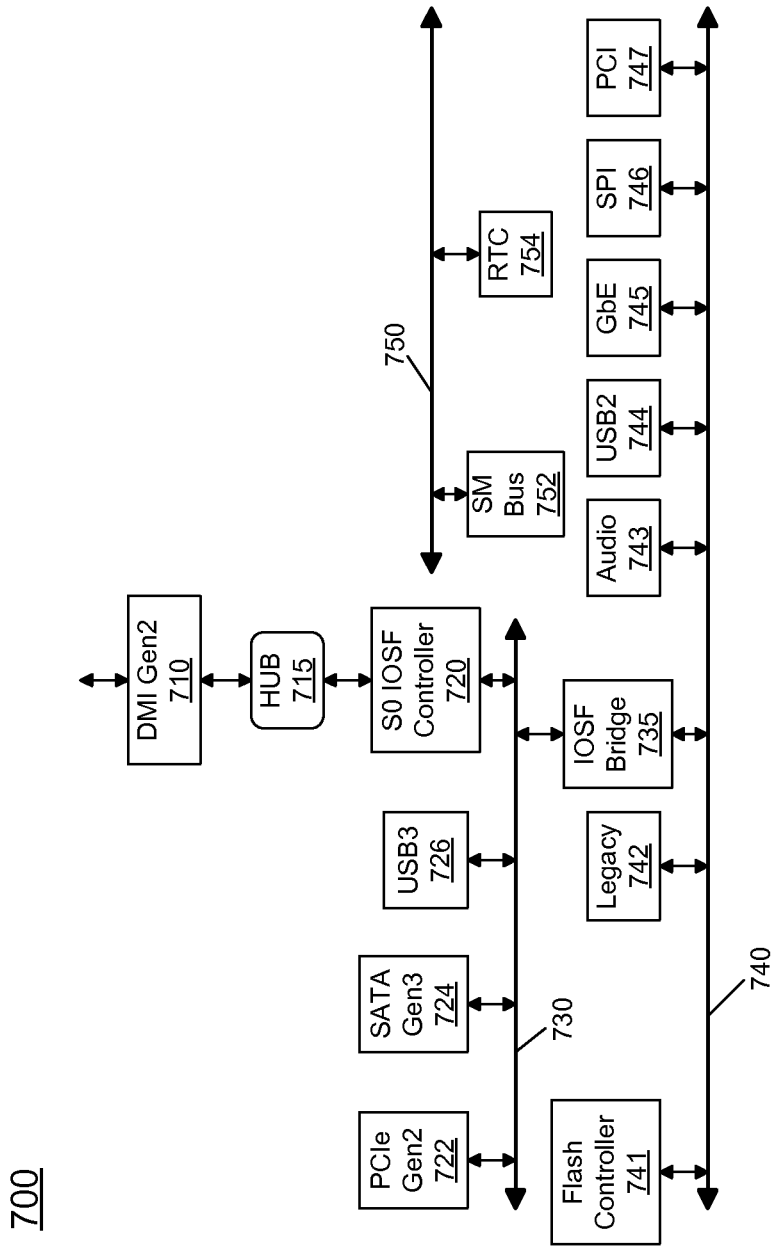
FIG. 11 is a more detailed block diagram of a portion of a SoC in accordance with an embodiment of the present invention.

Although the SoCs of FIGS. 3 and 4 are at a high level, understand that additional functionality may be present. Referring now to FIG. 11, shown is a more detailed block diagram of a portion of a SoC in accordance with an embodiment of the present invention. As shown in FIG. 11, the portion of SoC 700 shown may correspond to non-core portions coupled below a memory controller hub or other interface logic that can in turn interface to multiple processor cores, as well as to system memory.

Thus as seen, an off-die interface 710 (which in one embodiment can be a direct media interface (DMI)) may couple to a hub 715, e.g., an input/output hub that in turn provides communication between various peripheral devices. Although not shown for ease of illustration in FIG. 11, understand that various engines such as a manageability engine and a virtualization engine can also be directly coupled to hub 715.

To provide connection to multiple buses, which may be multi-point or shared buses in accordance with the IOSF specification, an IOSF controller 720 may couple between hub 715 and bus 730, which may be an IOSF bus that thus incorporates elements of the fabric as well as routers. In the embodiment shown in FIG. 11, first IOSF bus 730 may have coupled to it various controllers to provide for control of off-chip devices. Specifically, seen is a PCI controller 722, a SATA controller 724, and a USB controller 726. In turn, a second IOSF bus 750 may couple to a system management bus 752 and to a real time clock 754.

As further seen in FIG. 11, first IOSF bus 730 may couple to an IOSF bridge 735 for both primary and sideband information that in turn provides interconnection to a third bus 740, e.g., of a different protocol, to which various controllers and components may be attached. In the embodiment shown in FIG. 11, such components include a flash controller 741 to provide an interface to a non-volatile memory, a legacy device 742, which may implement various legacy functions, e.g., of a PCI specification and further may include an interrupt controller and timer. In addition, interfaces for audio 743, USB 744, gigabyte Ethernet (GbE) 745, serial peripheral interface (SPI) 746 and PCI 747 may all be provided. Although shown with this particular implementation in the embodiment of FIG. 11, understand the scope of the present invention is not limited in this regard.

Figure 12:
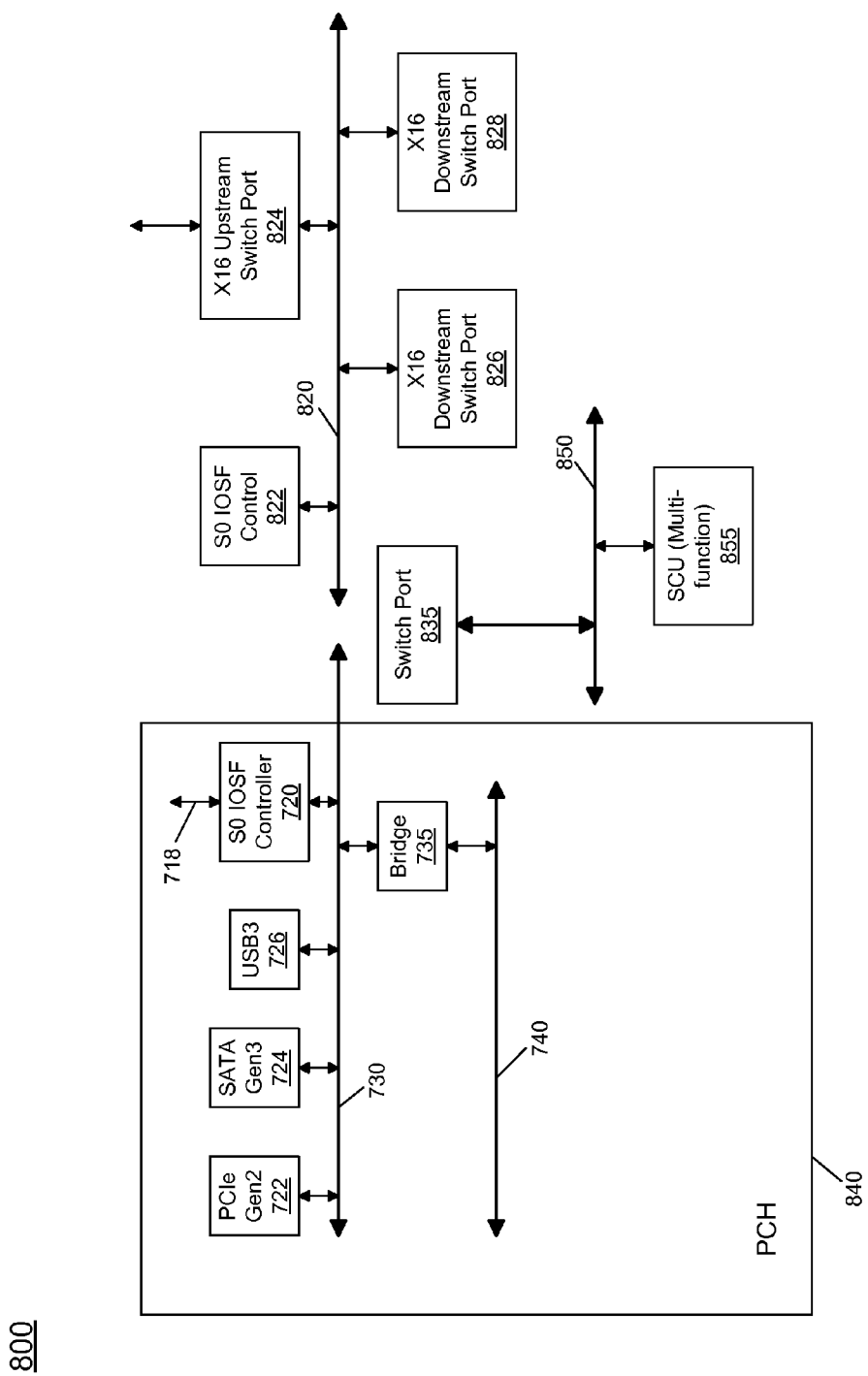
FIG. 12 is a block diagram of another SoC in accordance with an embodiment the present invention.

Still other implementations are possible. Referring now to FIG. 12, shown is a block diagram of another SoC in accordance with an embodiment the present invention. As shown in FIG. 12, SoC 800 may be configured for use, e.g., in server systems. As seen in FIG. 12, SoC may include a platform controller hub (PCH) 840, which may generally include components such as seen in the embodiment of FIG. 11. Namely, multiple IOSF buses 730 and 740 may be present, along with a bridge 735 to couple the buses. Bus 730 may include various agents coupled to it, including a PCIe controller 722, SATA controller 724, and a USB controller 726. In turn, via an IOSF controller 720, communication may occur via an additional bus 718, which may communicate with upstream devices, such as cores or other processing units (not shown for ease of illustration in the embodiment of FIG. 12).

As further seen in FIG. 12, for providing communications with other server-based components, an additional IOSF bus 820 may be provided, which in turn can communicate with an IOSF controller 822 and an upstream switch port 824 (e.g., an X16 port) that may be coupled to an upstream bus 825. Also coupled to bus 820 may be multiple downstream switch ports 826 and 828.

Furthermore, to enable communications, e.g., with storage units of a server-based system, a switch port 830 may couple between bus 820 and another IOSF bus 850, which in turn may be coupled to a storage controller unit (SCU) 855, which may be a multi-function device for coupling with various storage devices.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   receiving a request in a fabric from a first agent coupled to the fabric; and
   handling the request in the fabric according to one of a plurality of decode options including a first fabric decode option in which the fabric provides multiple grants to the first agent, a second fabric decode option in which the fabric provides a single grant to the first agent, a target decode option in which a target agent decodes the request, and a source decode option in which the first agent includes source decode information in the request, the fabric configured for at least two of the plurality of decode options.

2. The method of claim 1, further comprising handling a second request received in the fabric from a second agent coupled to the fabric according to a second one of the plurality of decode options.

3. The method of claim 1, wherein the first fabric decode option comprises:
   sending a show command grant to the first agent; and receiving a command portion of a transaction corresponding to the request from the first agent responsive to the show command grant, without causing the command portion of the transaction to be removed from a transaction queue of the first agent.

4. The method of claim 3, further comprising:
thereafter arbitrating the command portion with other transactions in a fabric arbiter of the fabric;
sending a transaction grant to the first agent for the transaction corresponding to the request; and
receiving the transaction corresponding to the request from the first agent responsive to the transaction grant.

5. The method of claim 4, further comprising determining if the target agent coupled to the fabric has a resource available to handle the transaction.

6. The method of claim 5, further comprising forwarding the transaction to the target agent if the target agent has the available resource.

7. The method of claim 4, further comprising determining a destination of the transaction using a mapping logic of the fabric to determine the target agent to receive the transaction.

8. The method of claim 7, further comprising instructing the target agent to exit a low power state responsive to determining that the transaction is destined for the target agent, and sending the transaction to the target agent so that the target agent receives the transaction when in an active state.

9. The method of claim 1, further comprising:
sending the request to a plurality of agents coupled to the fabric to request a first target decode in a first clock cycle; and
sending a second request to the plurality of agents to request a second target decode in a later clock cycle to pipeline the target decode of the second request.

10. The method of claim 9, further comprising receiving a response to the first target decode request in the fabric after the fabric sends the second target decode request to the plurality of target agents.

11. An apparatus comprising:
a fabric having an arbiter to arbitrate between a plurality of incoming requests received from a plurality of agents coupled to the fabric to select one of the incoming requests to be handled; and
the plurality of agents coupled to the fabric, wherein the fabric is to pipeline a plurality of target decode requests, each for a transaction, to the plurality of agents to determine a target agent for each of the transactions, wherein the fabric is configured for a plurality of decode options selected from a first fabric decode option in which the fabric provides multiple grants to a selected one of the plurality of agents, a second fabric decode option in which the fabric provides a single grant to the selected agent, a target decode option in which a target agent decodes an incoming request, and a source decode option in which one of the plurality of agents includes source decode information in the incoming request.

12. The apparatus of claim 11, wherein one of the plurality of agents is configured as a subtractive agent to issue a subtractive signal to indicate that the corresponding transaction is not directed to the subtractive agent.

13. The apparatus of claim 11, wherein the fabric is to receive a response to a first target decode request from each of the plurality of agents within N clock cycles after sending the first target decode request, and receive a response to a second target decode request from each of the plurality of agents within N+1 clock cycles after sending the first target decode request, when the fabric sends the second target decode request one clock cycle after the first target decode request.

14. The apparatus of claim 11, wherein the fabric is to pipeline the plurality of target decode requests for a plurality of transactions of a first type and to perform a fabric decode according to one of the first and second fabric decode options for a transaction of a second type.

15. The apparatus of claim 14, wherein the fabric includes a shadow storage including configuration information of the plurality of agents, the fabric to use the information in the shadow storage to perform the fabric decode.

16. The apparatus of claim 11, wherein the fabric is to receive a transaction from a second fabric coupled to the fabric, the transaction including a destination identifier for the transaction, wherein the fabric is to forward the transaction to a target agent of the transaction without performing a fabric decode or requesting a target decode.

17. The apparatus of claim 16, wherein the second fabric is to receive the transaction from a second agent, wherein the second agent is to include the destination identifier to the second fabric in a request corresponding to the transaction.

18. A system-on-chip (SoC) comprising:
a master agent;
a target agent; and
a fabric to couple the master agent to the target agent, wherein the fabric is configured for at least two decode options of a first fabric decode option, a second fabric decode option in which the fabric provides a single grant to the master agent, a target decode option in which the target agent decodes a request, and a source decode option in which the master agent includes source decode information in the request, and according to the first fabric decode option, the fabric is to:
receive the request from the master agent;
send a show command grant to the master agent responsive to selection of the request by a fabric arbiter of the fabric; and
receive a command portion of a transaction corresponding to the request and
determine the target agent to receive the transaction based on the command portion, and send a transaction grant to the master agent for the transaction.

19. The SoC of claim 18, wherein the fabric is to receive and store the transaction in a store and forward buffer.

20. The SoC of claim 18, wherein the fabric is to send the transaction to the target agent.

21. The SoC of claim 18, wherein the fabric is to update credits of a transaction credit tracker for a transaction queue of the target agent to which the transaction is sent.

* * * * *